J. J. GRANT.
Friction-Clutches.

No. 142,564. Patented September 9, 1873.

Witnesses
H. A. Daniels
C. H. Isham

Inventor.
John J. Grant by
Chas. S. Whitman
Attorney

UNITED STATES PATENT OFFICE.

JOHN J. GRANT, OF GREENFIELD, MASSACHUSETTS, ASSIGNOR TO HIMSELF, SOLON L. WILEY, AND CHARLES P. RUSSELL, OF SAME PLACE.

IMPROVEMENT IN FRICTION-CLUTCHES.

Specification forming part of Letters Patent No. 142,564, dated September 9, 1873; application filed August 16, 1873.

*To all whom it may concern:*

Be it known that I, JOHN J. GRANT, of Greenfield, county of Franklin and State of Massachusetts, have invented certain Improvements in Friction - Clutches. The following description, taken in connection with the accompanying plate of drawings hereinafter referred to, forms a full and exact specification, wherein are set forth the nature and principles of the invention, by which the same may be distinguished from others of a similar class, together with such parts thereof as are claimed as new and are desired to be secured by Letters Patent of the United States.

My invention relates to that class of mechanical appliances which are made use of for the purpose of establishing or breaking the connection between pulleys and the shafts upon which they rotate, known as friction-clutches; and the nature thereof consists in certain improvements in the construction of the same and novel combinations of parts, hereinafter shown and described.

Figure 1:
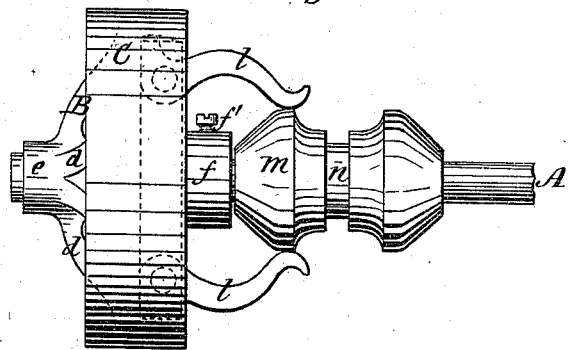
Figure 2:
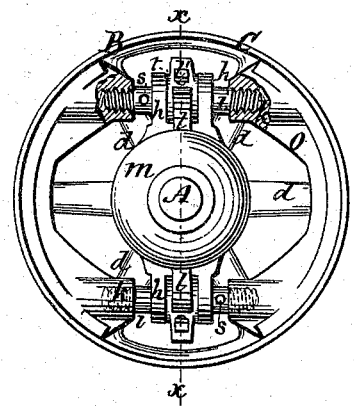
Figure 3:
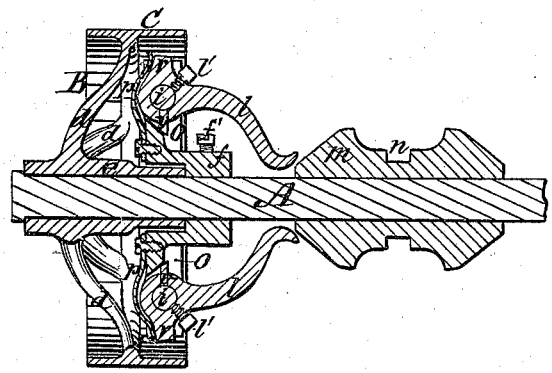

In the accompanying drawings, which illustrate my invention, and in which corresponding parts are designated by similar letters, Figure 1 is a side view of a pulley having my improvements applied thereto. Fig. 2 is a face view of the same. Fig. 3 is a longitudinal section taken in the line $x\ x$ of Fig. 2.

Upon the spindle or shaft designated A the pulley B, which is composed of the rim $c$, curvilinear radial spokes $d$, and hub $e$, is so arranged as to turn loosely. The carrier or hub piece $f$ is rigidly attached to the said shaft by means of the set-screw $f'$, and is provided with ears or projections $h$, in which are cylindrical apertures through which pass the shafts $i$, upon the ends of which, respectively, are cut right-handed and left-handed screws. The said screws are fitted to work in screw-holes cut at $k$, in the expansible frictional pads or segmental drivers $o$ in such a manner that when the said screws are properly turned the said pads will be pressed against the inner surface of the rim of the pulley with sufficient force to bind them firmly to the same. The shafts $i$ are rotated by means of the levers $l$, which are secured to the same by the set-screws $l'$ in such a manner that the screws upon the said shaft may be adjusted with the greatest facility by merely turning the shafts and clamping them in any desired position with the set-screws.

The levers $l$ are operated by the sliding wedge, collar, or conical hub $m$, which is provided with an annular groove, $n$, for the reception of the fork of the lever, by which it is caused to slide upon the shaft A. The said conical hub forces the levers outward and, through the medium of the screw-shafts $i$, throws the frictional pads $o$ into engagement with the inner surface of the pulley-rim, thereby clamping the said pulley to the shaft A, and causing it to revolve therewith. Owing to the fact that the said frictional parts are held and operated at the ends instead of at the centers thereof, they may be made to almost entirely fill the interior rim of the pulley, thereby obtaining a great amount of friction with a small amount of pressure. When the said conical hub is withdrawn the levers are caused to resume their normal position by stress of the spring $p$, which is rigidly attached to the carrier $f$ and so arranged as to press against the projections $r$ formed upon the said lever. The screw-shafts $i$, which have their bearings in the ears $h$ formed on the carrier $f$ and operate the expansible frictional pads $o$, are the fulcrum-pins upon which the levers $l$ revolve, and may be adjusted with reference to the said lever and frictional pads with the greatest nicety by the set-screws $l'$, by means of which the said shafts are secured to the said levers. To effect this result the set-screws are loosened and the shafts rotated by means of a nail or rod inserted in the apertures $s$, until the segments $o$ are made to occupy the required position. The shafts are then again clamped firmly to the levers by means of the set-screws. The said levers are fitted in slots $t$, cut for their reception in the ears $h$, and are provided with stops or projections $v$, which rest against the carrier and, in connection with the springs $p$, hold them firmly in position.

Having thus described the construction and operation of my invention, I claim as novel, and desire to secure by Letters Patent of the United States—

1. The rim $c$ of the pulley, expansive frictional pads o, and shafts i, when combined together, as and for the purposes described.

2. The shafts i, upon the ends of which are cut right-handed and left-handed screws, when combined, as herein described, with the segmental drivers or frictional pads o, as herein described.

3. The combination of cylindrical shaft i, lever l, and set-screw l', whereby the position of the shaft i may be accurately adjusted.

4. The combination of the carrier f, provided with ears h, levers l, frictional pads o, spring p, and pulley B, as and for the purposes described.

In testimony that I claim the foregoing I have hereunto set my hand.

JOHN J. GRANT.

Witnesses:
AUSTIN DE WOLF,
SAML. P. PIERCE.